US006407151B1

(12) United States Patent
Hoppe et al.

(10) Patent No.: US 6,407,151 B1
(45) Date of Patent: Jun. 18, 2002

(54) AQUEOUS COATING AGENT AND ITS USE IN LACQUERS

(75) Inventors: Lutz Hoppe, Walsrode; Hans-Günter Poersch-Panke, Bomlitz, both of (DE)

(73) Assignee: Wolff Walsrode AG, Walsrode (DE)

( * ) Notice: Subject to any disclaimer, the term of this patent is extended or adjusted under 35 U.S.C. 154(b) by 0 days.

(21) Appl. No.: 09/625,872

(22) Filed: Jul. 26, 2000

(30) Foreign Application Priority Data

Aug. 4, 1999 (DE) .......................................... 199 36 635

(51) Int. Cl.$^7$ ................................................. C08L 1/00
(52) U.S. Cl. ......................................................... 524/35
(58) Field of Search ............................................ 524/35

(56) References Cited

U.S. PATENT DOCUMENTS

| 4,306,998 A | | 12/1981 | Wenzel et al. ................. 260/13 |
| 4,321,169 A | | 3/1982 | Miller .......................... 524/428 |
| 4,352,902 A | * | 10/1982 | Nakayama .................... 524/40 |
| 4,517,324 A | | 5/1985 | Lühmann et al. .............. 524/27 |
| 5,384,163 A | | 1/1995 | Budde et al. ............. 427/385.5 |
| 5,387,642 A | | 2/1995 | Blum et al. .................. 524/591 |
| 5,804,528 A | * | 9/1998 | Aoki ........................... 503/524 |
| 6,001,913 A | * | 12/1999 | Thames ....................... 524/398 |
| 6,218,448 B1 | | 4/2001 | Kraaijevanger et al. ...... 524/31 |

FOREIGN PATENT DOCUMENTS

| CA | 1331667 | 8/1994 |
| DE | 4226243 | 2/1994 |

* cited by examiner

Primary Examiner—Paul R. Michl
(74) Attorney, Agent, or Firm—Joseph C. Gil; Aron Preis; James R. Franks

(57) ABSTRACT

A cellulose substance-containing lacquer emulsion prepared from
a) 5–50 wt. % of cellulose substance
b) 5–50 wt. % of one or more hydroxyl group-containing lacquer resins
c) 0.1–10 wt. % of polyisocyanates with more than one free isocyanate group
d) 0.5–30 wt. % of plasticizer
e) 0.0–20 wt. % of emulsifier
f) 0.0–45 wt. % of at least one organic solvent
g) 10–65 wt. % of water wherein the sum of a) to g) is always 100 wt. %, characterized in that the ratio by weight of OH groups (from the lacquer resin) to NCO groups is 1:0.01–1.0 is described.

7 Claims, No Drawings

AQUEOUS COATING AGENT AND ITS USE IN LACQUERS

Nitrocellulose combi-lacquers, prepared by dissolving nitrocellulose (NC), an alkyl resin, plasticiser and possibly optional lacquer additives in organic solvents are known. These lacquers may be used to lacquer surfaces such as e.g. wood, metal, paper, leather, plastics, etc. The disadvantage of these is the high solvent content of 60to80%.

EP 0 076 443 describes the preparation, inter alia, of aqueous NC/alkyd resin emulsions in which the solvent is entirely or partly replaced by water. If surfaces, e.g. of wood, are lacquered with these aqueous emulsions and the chemical resistance determined in accordance with DIN 68 861, part 1, 1 B, then the resistances to water, ethanol and acetone are not sufficient.

Chemically cross-linking aqueous two-component polyurethane coating agents with free polyisocyanates as hardeners for the binder were described in EP 0 358 979. According to that document, polyhydroxyacrylates as binder components are capable of emulsifying certain polyisocyanates with free isocyanate groups, these also being called lacquer polyisocyanates. The aqueous two-component system produced in this way cures to give cross-linked films. The lacquer polyisocyanates are biuret, urethane, uretdione and/or isocyanate group-containing oligomeric derivatives of readily available monomeric or simple diisocyanates, in particular of hexamethylene diisocyanate (HDI), isophorone diisocyanate (IPDI) and/or bis(isocyanatocyclohexyl) methane (HMDI). The lacquer polyisocyanates used in accordance with EP 0 3 358 979 have a viscosity at 23° C. of up to 1000 mPa·s and have an average NCO functionality of 2.2 to 5.

DE-OS-A 4 226 243 describes an aqueous two-component coating agent based on polyisocyanates and self-emulsifying fatty acid modified polyesters and polyurethanes. European patent application EP-A 0 496 205 also describes aqueous binder combinations based on polyisocyanates and self-emulsifying urethane, carboxyl and hydroxyl group-containing polyester resins. German patent DE 3 122 030 describes coating compositions consisting of polyisocyanate and water-dilutable alkyd, melamine and acrylic resins which also contain water-miscible solvent.

The disadvantage of these water-dilutable two-component binders described above is the low solids content which can be achieved, the short pot life and the long drying/curing times. Furthermore, wetting onto wood, the initial hardness and the sandability are unsatisfactory.

Now, the object of the invention comprises improving the resistance of aqueous NC lacquer resin emulsions so that good resistances in accordance with DIN 68 861, part 1, B 1, are achieved with these aqueous single-component systems.

The invention concerns an aqueous emulsion the process of its preparation entails adding a cellulose substance to the reaction products or to a mixture of a poly-isocyanate with a lacquer resin that contains at least one hydroxyl group. A single component lacquer emulsion is obtained by adding at least one plasticizer and water and optionally at least one emulsifier and organic solvent.

The lacquer emulsions comprise a product prepared from:
a) 5–50 wt. % of cellulose substance
b) 5–50 wt. % of one or more hydroxyl group-containing lacquer resins
c) 0.1–10 wt. % of polyisocyanates with more than one free isocyanate group
d) 0.5–30 wt. % of plasticiser
e) 0.0–20 wt. % of emulsifier
f) 0.0–45 wt. % of at least one organic solvent
g) 10–65 wt. % of water wherein the sum of a) to g) is always 100 wt. %, characterised in that the ratio by weight of cellulose substance to OH group-containing lacquer resin is 1:5 to 5:1 and the ratio by equivalents of OH groups (from the lacquer resin) to NCO groups is 1:0.01–1.0.

Suitable cellulose substances are preferably cellulose esters, in particular nitrocelluloses of any level of viscosity or plasticised nitrocelluloses or mixtures of these. Nitrocellulose, for example in conventional industrial nitrocellulose grades, i.e. cellulose nitrates with a nitrogen content of 10.7 to 12.6 wt. %, is very particularly suitable.

Other cellulose substances which can be used are cellulose acetobutyrate and cellulose acetopropionate in varying stages of viscosity and substitution.

Conventional lacquer resins may be used as lacquer resins if these contain isocyanate-reactive groups such as e.g. —OH, —COOH, —NH$_2$, —CONH$_2$. Conventional lacquer resins are e.g. alkyd, maleic acid, phenol, formaldehyde, xylene-formaldehyde, ketone, sulfonamide, aldehyde, amine, epoxy, carbamate, coumarone/indene resins, esters of saccharose and vinyl or acrylate resins and copolymers of these.

It is advantageous if the hydroxyl group-containing lacquer resins have an OH value between 20 and 200 mg KOH/g.

Plasticisers which may be used are conventional plasticisers such as e.g. the esters of aliphatic monocarboxylic acids, preferably with 2 to 18 carbon atoms such as cetyl acetate, glycol diacetate, stearates, ricinoleic acetate, dicarboxylic acids such as e.g. dioctyl adipate, dimethylcycohexylmethyl adipate, dibutyl sebacate; aromatic dicarboxylic acids such as e.g. dibutyl phthalate, dioctyl phthalate, dicyclohexyl phthalate, aliphatic tricarboxylic acids, preferably with 8 carbon atoms, of aromatic dicarboxylic acids and of monohydric alcohols with 2 to 10 carbon atoms, of dihydric alcohols with 2 to 6 carbon atoms and trihydric alcohols with 3 carbon atoms or the esters of inorganic acids such as e.g. tributyl phosphate, triphenyl phosphate; esters of citric acid with alcohols with 1 to 5 carbon atoms which may also be reacted with monocarboxylic acids with 1 to 4 carbon atoms; and also sulfonamides, oils such as castor oil and linseed oil and the alkoxylation products of the compounds mentioned such as e.g. ethoxylated castor oil and soya oil, stearates and phosphates.

The emulsifiers used are optionally anionic emulsifiers, for example long-chain alkylaryl sulfonates such as dodecylbenzene sulfonate or butylnaphthaline sulfonate, alkyl sulfates such as lauryl or stearyl alcohol sulfates, sulfosuccinates such as dioctyl disodium succinate, or non-ionic emulsifiers such as octyl- or nonylphenol-oxyethylates.

The disodium salts of sulfosuccinic acid derivatives of ethoxylated nonylphenols may also be mentioned as anionic emulsifiers.

Conventional organic solvents may be used as solvents provided the cellulose substance and the lacquer resin are soluble therein.

The polyisocyanates are any organic polyisocyanates with aliphatically, cycloaliphatically, araliphatically and/or aromatically bonded, free isocyanate groups which are liquid at room temperature. Particularly preferably, the polyisocyanates are polyisocyanates or polyisocyanate mixtures with exclusively aliphatically and/or cycloaliphatically bonded isocyanate groups with an (average) NCO functionality of between 1.8 and 5.0.

If required, the polyisocyanates may be used mixed with small amounts of inert solvents in order to lower the viscosity to a value within the range mentioned.

Suitable products are, for example, "lacquer polyisocyanates" based on hexamethylene diisocyanate or on 1-isocyanato-3,3,5-trimethyl-5-isocyanatomethyl-cyclohexane (IPDI) and/or bis-(isocyanatocyclohexyl)-methane, in particular those which are based exclusively on hexamethylene diisocyanate. "Lacquer polyisocyanates" based on these diisocyanates are understood to be the biuret, urethane, uretdione and/or isocyanate group-containing derivatives known per se of these diisocyanates.

Also suitable according to the invention, but less preferred, aromatic polyisocyanates are in particular "lacquer polyisocyanates" based on 2,4-diisocyanatotoluene or technical grade mixtures of this with 2,6-diisocyanatotoluene or based on 4,4-diisocyantodiphenylmethane or mixtures of this with its isomers and/or higher homologues. These types of aromatic lacquer polyisocyanates are, for example, urethane group-containing isocyanates such as are obtained by reacting Excess amounts of 2,4-diisocyanatotoluene with polyhydric alcohols such as trimethylolpropane. Further aromatic lacquer polyisocyanates are, for example, trimers of the monomeric diisocyanates mentioned by way of example, i.e. the corresponding isocyanato-isocyanurates.

Basically, the use of unmodified polyisocyanates of the type mentioned by way of example is obviously also possible.

The polyisocyanate component may generally consist of any mixture at all of the polyisocyanates mentioned by way of example.

Hydrophilised polyisocyanates of the basic products mentioned above, which can readily be emulsified in water, are also suitable.

The cellulose substance/lacquer resin emulsion is prepared in accordance with EP 0 076 443.

Reaction, e.g. of the OH group-containing alkyd resin, dissolved in e.g. butyl acetate, with a polyisocyanate, is performed at temperatures up to a max. of 80° C., preferably up to 60° C., wherein the OH: NCO ratio has to be adjusted so that the resin does not gel but is still effectively film-forming. The NCO groups do not have to react completely with the OH groups in the lacquer resin.

The cellulose substance, plasticiser, optionally emulsifiers, optionally organic solvents are added to the alkyd resin modified in this way and stirred until fibres of the cellulose substance can no longer be seen. The material then passes through a highly viscous state. An oil-in-water emulsion (single-component system) is produced by adding water. It is also possible to add further hydrophilic polyisocyanates to this emulsion in order then to obtain a "two-component system".

The invention also provides use of the coating agent according to the invention in lacquers for the surface treatment of wood, metal, plastics, paper, leather or glass.

Depending on the area of application (e.g. wood, metal, plastics, paper, leather, glass and film lacquering), other known organic solvents may also be added to the emulsion, wherein a solvent concentration of 30%, with respect to the final lacquer formulation, should not be exceeded.

The viscosity may be adjusted for use in the desired application either with water or by adding water-soluble thickeners based e.g. on polyurethanes, cellulose, guar, starch and the like.

Furthermore, substances which improve the processing or application properties such as e.g. lubricants, gloss-improving agents, anti-foam agents, sandability-improving agents, flow control agents, stabilisers, light stabilisers and colorants, pigments and conventional lacquer additives may also be added to the emulsion, preferably to the aqueous phase.

Aqueous coating agent emulsions prepared according to the invention have very good flow characteristics, high gloss and good resistance to water, ethanol and acetone in accordance with DIN 68 861, part 1, 1 B.

EXAMPLES

In a 2 l stirred vessel, the polyisocyanate is added to the hydroxyl group-containing alkyd resin, with stirring (100 rpm) at 20° C. After the addition of dibutyltin dilaurate, the mixture is heated to 60° C. and stirring is continued for 2 hours. After adding the emulsifier, dibutyl phthalate and methoxypropyl acetate, nitrocellulose of the standard type E 24 ($N_2$ content=12.1 wt. %) wetted with 35 wt. % of water is added and the mixture is homogenised for 1 h at 60° C. and 50 rpm. Then water is added and the speed of stirring is increased to 900 rpm while the mixture is simultaneously cooled to room temperature.

|  | Example 1 | Example 2 | Example 3 |
| --- | --- | --- | --- |
| OH-containing alkyd resin | 326.9 g v.[1] | 286.9 g v.[2] | 326.9 g v.[1] |
| Isophorone diisocyanate | 10.4 g | 15.9 g | — |
| Bis(isocyanatocyclo-hexyl)methane | — | — | 12.3 g |
| Dibutyltin dilaurate | 0.2 g | 0.2 g | 0.2 g |
| Emulsifier 1[3] | 21.3 g | 21.3 g | 32.0 g |
| Emulsifier 2[4] | 6.7 g | 6.7 g | 10.0 g |
| DBP | 18.7 g | 18.7 g | 28.0 g |
| Methoxypropyl acetate | 25.3 g | 25.3 g | 38.0 g |
| Nitrocellulose std. type E 24 | 120.6 g | 120.6 g | 180.9 g |
| Water | 342.7 g | 391.6 g | 423.4 g |
| Solids content | 38.7 wt. % | 39.9 wt. % | 38.0 wt. % |
| DIN-4 viscosity at 20° C. | 21 s | 13 s | 18 s |
| pH | 5.2 | 6.2 | 5.4 |
| NC:alkyl | 1:2.6 | 1:2.6 | 1:1.73 |
| OH:NCO | 1:0.3 | 1:0.21 | 1:0.3 |

[1] The hydroxyl group-containing alkyd resin "Halweftal B 32", obtained from Hüttenes-Alberts Lackrohstoff GmbH, was used as a 62.4 wt. % strength alkyd resin dissolved in butyl acetate (OH value = 152 mg KOH/g sample).
[2] The hydroxyl group-containing alkyd resin prepared in accordance with example 1 in NL application 1 008 777 was used as a 71.1 wt. % strength alkyd resin in butyl acetate (OH value = 145 mg KOH/g sample).
[3] Emulsifier 1: Mixture of polyethoxytridecyl-ether-phosphate and tridecyl-poly(ethoxy)-ethanol (commercial product "Rhodafac RS 710" from Rhone Poulenc Chemie).
[4] Emulsifier 2: Triglyceride-ethoxylate (commercial product "Product GN 8403/50" from Zschimmer & Schwarz).

To determine the resistance to chemicals in accordance with DIN 68 861, part 1, 1 B, 8 g of butyl glycol acetate were added to 100 g of emulsion from example 1, 6 g were added to the emulsion from example 2 and 8 g were added to the emulsion from example 3.

The emulsions were applied as primer and topcoat lacquer to wood using a 120 μm. doctor blade. The primer was dried at 50° C., sanded and topcoat lacquered. In accordance with DIN 68 861, part 1, 1 B, the final coating was dried for 7 days at 50° C., then stored for 24 h at room temperature and then the resistance to water, ethanol and acetone were determined.

For comparison, in accordance with EP-B 0 076 443, NC/alkyd resin emulsion 4 was prepared from the same starting materials as example 1 and emulsion 5 was prepared as in example 2, but without polyisocyanate and without dibutyltin dilaurate. 6 g of butyl glycol acetate were added to 100 g of each of the emulsions 4 and 5 before applying these to wood. The resistance to water, ethanol, and aceton, respectively according to DIN 68 861, part 1, 1 B are summarised in the following table:

|  | Water | Ethanol | Acetone |
|---|---|---|---|
| Example 1 | 0 | 0 | 0 |
| Example 2 | 0 | 0 | 0 |
| Example 3 | 0 | 0 | 0 |
| Emulsion 4 | 4 | 4 | 5 |
| Emulsion 5 | 4 | 4 | 5 |

What is claimed is:

1. A lacquer emulsion comprising the product of a reaction of,
    a) 5–50 wt. % of cellulose substance, with
    b) 5–50 wt. % of one or more hydroxyl group-containing lacquer resins, and
    c) 0.1–10 wt. % of polyisocyanates with more than one free isocyanate group,
    said product further containing
        d) 0.5–30 wt. % of plasticizer,
        e) 0.0–20 wt. % of emulsifier,
        f) 0.0–45 wt. % of at least one organic solvent, and
        g) 10–65 wt. % of water wherein the sum of a) to g) is 100 wt. %, and the ratio by weight of hydroxyl groups of said lacquer resin b) to NCO groups of said polyisocyanates c) is 1:0.01–1.0.

2. The lacquer emulsion of claim 1 wherein the cellulose substance a) is cellulose ester.

3. The lacquer emulsion of claim 1 wherein the lacquer resin b) has an OH value of 20 to 200 mg KOH/g.

4. A process for preparing the lacquer emulsion of claim 1 comprising:
    (i) combining said polyisocyanate c) with said hydroxyl group-containing lacquer resin b) in the presence of a catalyst to produce a reaction, and adding said cellulose substance a) during or after the completion of said reaction, to obtain a reaction product;
    (ii) adding to said reaction product at least one plasticizer d) to obtain a mixture;
    (iii) homogenizing said mixture; and
    (iv) adding said water g) to obtain an oil-in-water emulsion.

5. A method of using the lacquer emulsion of claim 1 comprising applying said emulsion to at least one surface of material selected from the group consisting of wood, metal, paper, plastics, leather and glass.

6. The lacquer emulsion of claim 1 wherein the ratio by weight of cellulose substance a) to lacquer resin c) is from 1:5 to 5:1.

7. The lacquer emulsion of claim 1 wherein the NCO functionality of the polyisocyanate c) is between 1.8 and 5.0.

* * * * *